US009389308B1

(12) United States Patent
Koulomzin et al.

(10) Patent No.: US 9,389,308 B1
(45) Date of Patent: *Jul. 12, 2016

(54) PROXIMITY DETECTION VIA AUDIO

(71) Applicant: Google Inc., Mountain View, CA (US)

(72) Inventors: Daniel G. Koulomzin, Jamaica Plain, MA (US); Christopher R. Wren, Arlington, MA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,502

(22) Filed: Sep. 23, 2015

Related U.S. Application Data

(63) Continuation of application No. 13/408,308, filed on Feb. 29, 2012, now Pat. No. 9,148,742.

(60) Provisional application No. 61/513,390, filed on Jul. 29, 2011.

(51) Int. Cl.
| G08B 21/00 | (2006.01) |
| G01S 11/14 | (2006.01) |
| G10L 19/018 | (2013.01) |
| H04W 4/02 | (2009.01) |
| G08B 1/00 | (2006.01) |

(52) U.S. Cl.
CPC .............. G01S 11/14 (2013.01); G10L 19/018 (2013.01); H04W 4/023 (2013.01); G06Q 2220/00 (2013.01); G08B 1/00 (2013.01)

(58) Field of Classification Search
CPC .............................. G08B 1/00; G06Q 2220/00
See application file for complete search history.

(56) References Cited

U.S. PATENT DOCUMENTS

| 2006/0002543 | A1 | 1/2006 | Newland | |
| 2010/0112991 | A1 | 5/2010 | Hannaby | |
| 2012/0083286 | A1* | 4/2012 | Kim | G06Q 30/0261 455/456.1 |

* cited by examiner

*Primary Examiner* — Shirley Lu

(74) *Attorney, Agent, or Firm* — Fish & Richardson P.C.

(57) ABSTRACT

Methods, systems, and apparatus, including computer programs encoded on a computer storage medium, for detecting ambient audio, generating audio data based on the ambient audio, generating a first audio fingerprint based on the audio data, providing the first audio fingerprint to a fingerprint comparison engine, the fingerprint comparison engine providing a comparison between the first audio fingerprint and a second audio fingerprint, and receiving a proximity signal based on the comparison.

20 Claims, 5 Drawing Sheets

PROXIMITY DETECTION VIA AUDIO

CROSS-REFERENCE TO RELATED APPLICATIONS

This application is a continuation of U.S. patent application Ser. No. 13/408,308, filed on Feb. 29, 2012, which claims priority under 35 USC §119(e) to U.S. Patent Application Ser. No. 61/513,390, filed on Jul. 29, 2011, the entire contents of which are hereby incorporated by reference in its entirety for all purposes.

TECHNICAL FIELD

The present disclosure relates to proximity detection between computing devices, and, in particular, proximity detection via audio.

BACKGROUND

When in unfamiliar settings, it would be very useful for a person to be able to automatically discover who else was nearby, and also what other resources were near that person. For example, at conferences, meetings and other social engagements, discovering what people are near you would be beneficial. Further, many individuals would benefit from being able to discover other resources that are nearby. For example, a user of a mobile computing device may need to print a document, such as when out of the office, and would thus benefit from being able to detect the nearest available printer.

Proximity detection facilitates locating people and other resources that are nearby the user's computing device.

SUMMARY

Innovative aspects of the subject matter described in this specification may be embodied in methods that include the actions of receiving, by a first mobile device, a request from a first user of the first mobile device to activate a first proximity detection service of the first mobile device, receiving, by a second mobile device, a request from a second user of the second mobile device to activate a second proximity detection service of the second mobile device, capturing, by a first audio sensor of the first mobile device, first audio signals, generating, by the first mobile device, first audio data based on the first audio signals, generating one or more first audio fingerprints based upon the first audio data, capturing, by a second audio sensor of the second mobile device, second audio signals, generating, by the second mobile device, second audio data based on the second audio signals, generating one or more second audio fingerprints based upon the second audio data, generating, using the one or more first and second audio fingerprints, a similarity score that indicates a similarity between the first audio signals and the second audio signals, determining that the similarity score exceeds a threshold similarity score, based on the determining, generating a proximity signal usable to indicate that the first mobile device is proximate to the second mobile device, and providing, by the first mobile device, the second mobile device, or both the first and second mobile devices, an indication that the first user is proximate to the second user. Other embodiments of these aspects include corresponding systems, apparatus, and computer programs, configured to perform the actions of the methods, encoded on computer storage devices.

These and other embodiments may each optionally include one or more of the following features. For instance, generating, by the second mobile device, the first audio signals; and actions further include decoding, by the first mobile device, the first audio signals to determine an identifier associated with the second mobile device.

Innovative aspects of the subject matter described in this specification may be embodied in computing devices including: a computer-readable medium coupled to one or more processors having instructions stored thereon which, when executed by the one or more processors, cause the one or more processors to perform operations including: detecting ambient audio, generating audio data based on the ambient audio, generating a first audio fingerprint based on the audio data, providing the first audio fingerprint to a fingerprint comparison engine, the fingerprint comparison engine providing a comparison between the first audio fingerprint and a second audio fingerprint, and receiving a proximity signal based on the comparison.

These and other embodiments may each optionally include one or more of the following features. For instance, the proximity signal indicates that another computing device is proximate to the computing device; the another computing device is a source of the second audio fingerprint; the ambient audio includes audio generated by another computing device, the another computing device being a source of the second audio fingerprint; operations further include decoding the audio generated by the another computing device to determine an identifier associated with the another computing device; the audio generated by the another computing device is sub-sonic audio; the fingerprint comparison engine is executed using a server system and the first audio fingerprint is provided to the server system by transmitting the first audio fingerprint to the server system over a network; the first audio fingerprint is generated using a fingerprinting engine, the fingerprinting engine being executed on the computing device; the fingerprint comparison engine is executed on the computing device; comparison includes: determining a similarity score based on the first audio fingerprint and the second audio fingerprint, comparing the similarity score to a threshold similarity score, and generating the proximity signal based on comparing the similarity score to a threshold similarity score; the proximity signal indicates that the computing device is located proximate to another computing device when the similarity score is greater than the threshold similarity score, the another computing device being a source of the second audio fingerprint; the proximity signal is further based on a coarse location signal; the coarse location signal comprises at least one of a global positioning system (GPS) signal, a WiFi signal and a cellular triangulation signal; operations further include: generating a coarse location signal, and providing the coarse location signal to the fingerprint comparison engine; generating the coarse location signal includes executing a location-aware computer program application on the computing device, the location-aware computer program application generating the coarse location signal; and the computing device is a mobile computing device.

Particular embodiments of the subject matter described in this specification may be implemented so as to realize one or more of the following advantages. The ability to determine people that are proximate to a user (such as at a meeting or event); recommending people to a user that the user has been socially proximate to for invitations to future events, inclusion in a friends list, selection of recipient lists, membership in a group, or subscription to a feed; generating a contact list database of people that a user is socially proximate with, the database including time, duration, and location; and associating people with the user that have "checked-in" at a venue the user is located at.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
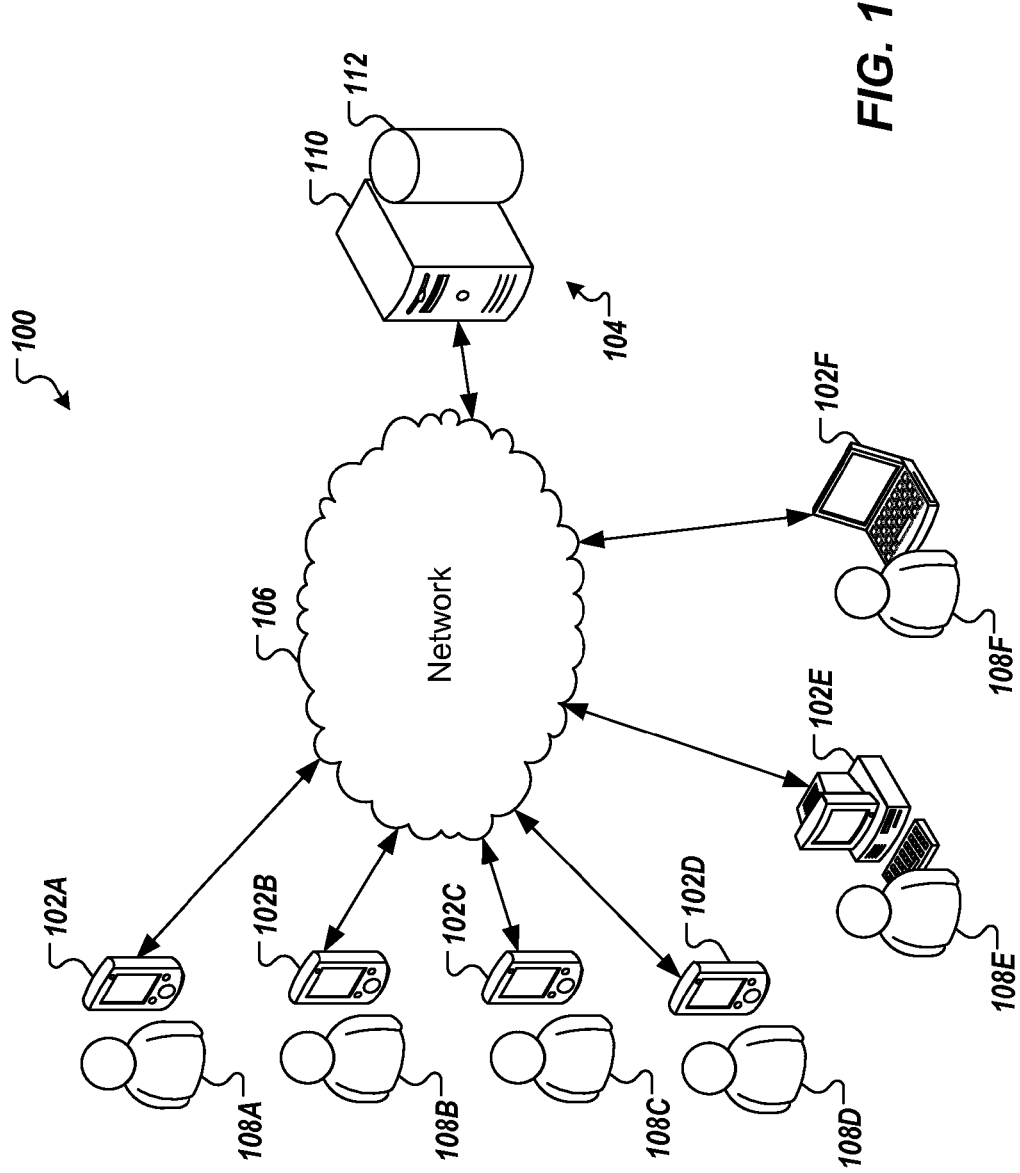
FIG. 1 is a diagram of an example system that can execute implementations of the present disclosure.

This specification describes systems, methods, computer programs, and storage media for detection and/or confirmation that two or more devices are within a proximity of one another. In some implementations, two or more devices are considered proximate when the two or more devices are exposed to (e.g., hear or perceive) substantially the same audio (i.e., sound waves) from an audio source. In some implementations, a device can detect the audio and generate corresponding audio signals via one or more components, such as a microphone. When the two or more devices detect substantially the same audio, the two or more devices can be deemed proximate to one another. For example, two devices located in a conference room can each detect audio generated by an audio source (e.g., a person giving an oral presentation). Consequently, the two devices can be considered proximate to one another.

To determine whether two or more devices are considered proximate to one another, an analysis of what audio each device detects is performed. In some implementations, each device obtains (e.g., acoustically detects) reference audio within an environment where the device is located. For each device that obtains the reference audio, the reference audio is analyzed and an audio fingerprint can be generated. The audio fingerprints of the respective devices can be compared to determine whether the devices are proximate to one another. In some implementations, the audio fingerprints can be compared by each device, one of the two or more devices, and/or by a central processing device, such as a central server.

The audio fingerprints generated by each device are compared to one another to determine whether they correspond to the same reference audio. In some implementations, a similarity score between the audio fingerprints is generated. If the similarity score is greater than a threshold similarity score, it is determined that the audio fingerprints represent the same reference audio. However, if the similarity score is not greater than the threshold similarity score, the audio fingerprints can be determined not to represent the same reference audio. If the audio fingerprints represent the same reference audio, the devices associated with the compared audio fingerprints can be determined to be proximate to one another. In some implementations, the similarity score can indicate a proximity level between the devices (i.e., how proximate the devices are). For example, the higher a similarity score between two devices, the more proximate, or closer, the two devices are.

In some implementations, the reference audio is passively produced. For example, the reference audio can include ambient sound generated by one or more sources in the environment where the devices are located. In some examples, the ambient audio can include environmental noise. In some implementations, the reference audio is actively produced by one or more of the devices. For example, one or more of the devices can produce audio (e.g., a ring, a buzz, a chirp) that can be audible or inaudible (e.g., sub-sonic) which audio can be detected by the other devices.

In some implementations, whether the devices are proximate to one another can be further determined based on a coarse location signal. Example coarse location signals can include a location signal generated using a global positioning system (GPS), Wi-Fi locations, and/or cellular telephone towers (e.g., cellular tower location triangulation). This can be referred to as coarse proximity detection between the devices. For example, a first device can be in a first room and a second device can be in a second room that is adjacent to the first room. Although the first and the second devices could be determined to be physically near one another, the first and the second devices might not be determined to be proximate to one another (e.g., respective users of the devices may not be able to see or hear one another, and may not be aware that the other user is in an adjacent room). To confirm the proximity between the devices, fine proximity detection can be employed by determining whether the devices detect substantially the same audio from an audio source. Furthermore, by using a coarse proximity between the devices, situations can be prevented in which the devices detect substantially the same audio, but are in different locations. For example, a situation in which the devices detect substantially the same audio, such as a song on a car radio, but are located in differing geographical areas (and thus not proximate), such as in different cars.

In some implementations, the devices can be located geographically near to one another without occupying the same social space (e.g., socially proximate). Social spaces include spaces in which humans can employ human senses (such as talking, touching, seeing, and hearing) to communicate with one another such as a room in a home, a room in a hotel, a conference room in an office, and/or a restaurant. For example, in an office complex, two devices can be respectively located in two adjacent offices that are separated by a wall. Consequently, the two devices can be determined to be geographically near to one another. However, the two devices might not be determined to be proximate to one another, because the two devices do not occupy the same social space. For example, the two devices might not be able to acoustically detect substantially the same reference sound.

In some implementations, a reference sound (e.g., a chirp) can be generated by one or more of the devices and can include encoded information. In some examples, the encoded information can include an identifier that identifies the source of the actively generated reference audio (e.g., the "chirp"). The device that audibly detects the actively generated reference audio can decode the encoded information associated with the reference audio. The decoding can include identifying the source of the reference audio. The proximity of the devices (i.e., the device that generates the reference audio and the device that audibly detects the reference audio) can be established when the device decodes the encoded information.

FIG. 1 is a diagram of an example system 100 that can execute implementations of the present disclosure. The system 100 includes computing devices 102A-102F that can each communicate with a server system 104 over a network 106. Each of the computing devices 102A-102F is associated with an user 108A-108F, respectively. The network 106 can include a large computer network, such as a local area network (LAN), a wide area network (WAN), the Internet, a cellular network, or a combination thereof connecting any number of mobile computing devices, fixed computing devices and server systems. The server system 104 includes one or more computing devices 110 and one or more machine-readable repositories, or databases 112.

In the example system 100, the computing devices 102A-102D are illustrated as mobile computing devices, the computing device 102E is illustrated as a desktop-type computing device and the computing device 102F is illustrated as a laptop-type computing device. It is appreciated, however, that the computing devices 102A-102F can each include any type of computing device such as a desktop computer, a laptop computer, a handheld computer, a personal digital assistant (PDA), a cellular telephone, a network appliance, a camera, a smart phone, an enhanced general packet radio service (EG-PRS) mobile phone, a media player, a navigation device, an email device, a game console, or a combination of any two or more of these data processing devices or other data processing devices.

Each of the computing devices 102A-102F can be located a distance from each of the remaining computing devices 102A-102F. The distances between each of the computing devices 102A-102F can vary. For example, the computing device 102B can be located a first distance from the computing device 102C and further the computing device 102B can be located a second, differing distance from the computing device 102A. In some implementations, the distances between each of the computing devices 102 can vary with time. For example, the users 108A-D and 108F can change the location of the respective associated computing devices 102A-D and 102F by physically moving the computing devices 102A-D and 102F (e.g., the user 108A can carry the computing device 102A as the user 108A moves). The distances between each of the computing devices 102A-102F can vary greatly. For example, the computing device 102D can be located many miles from the computing device 102C, but located within a few feet of the computing device 102B. When two or more computing devices 102A-102F are sufficiently near to one other (explained further below), the two or more computing devices 102A-102F can be determined to be proximate to one another.

Figure 2:
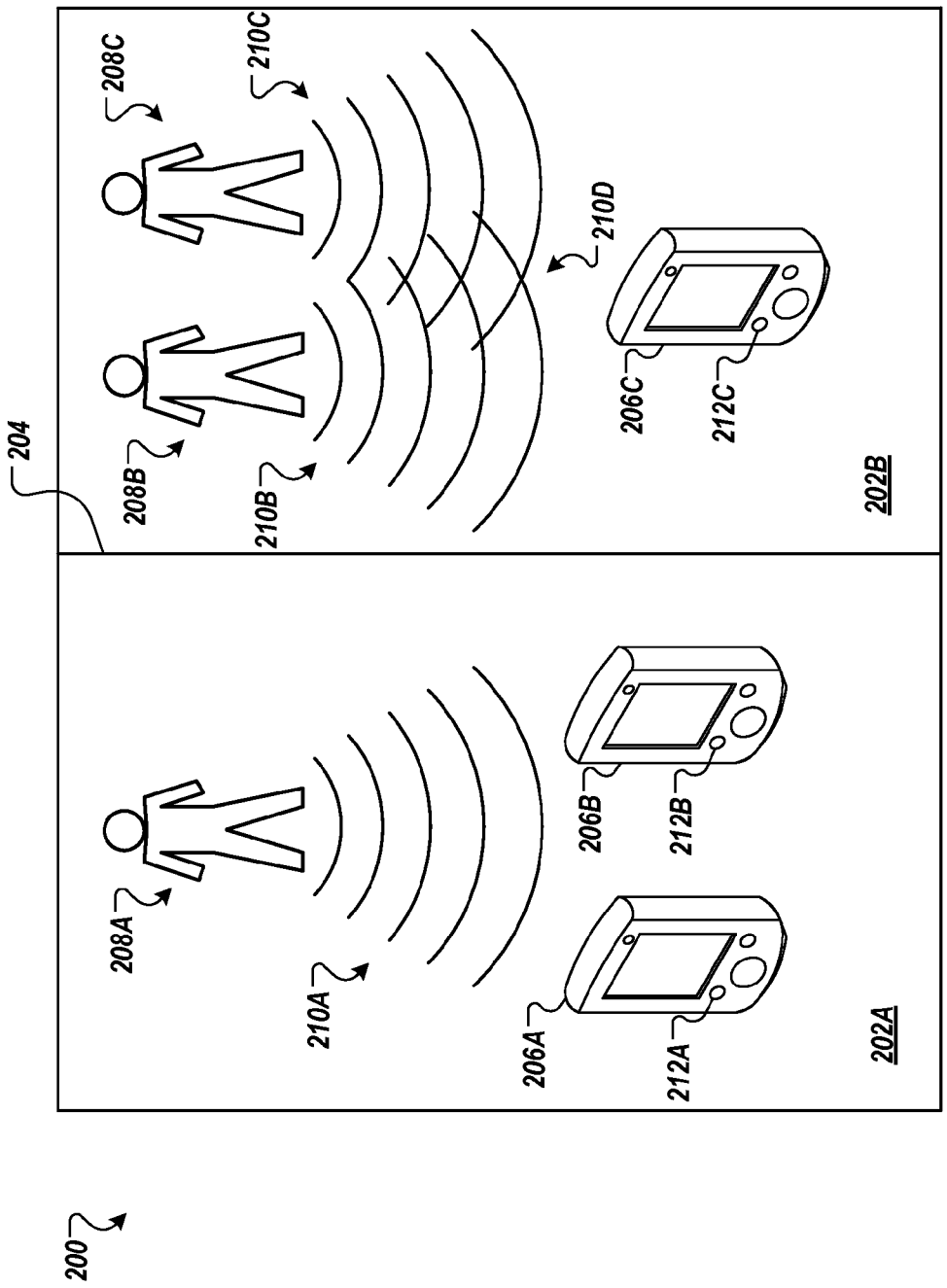
FIG. 2 depicts an example environment including mobile devices positioned within human-interactive social spaces.

FIG. 2 depicts an example environment 200 including mobile devices positioned within human-interactive social spaces. The example environment 200 includes a social space 202A and a social space 202B (commonly referred to as social spaces 202). It is appreciated, however, that the environment 200 can include any number of social spaces 202. The social spaces 202 can be any space where humans can interact with one another, such as spaces that involve employing human senses (e.g., talking, touching, seeing and hearing) to communicate with or otherwise perceive the presence of one another. For example, the social spaces 202 can include rooms such as a bedroom, an office, and a conference room; venues such as sporting arenas, auditoriums, and theatres; and outside venues such as a park or a backyard, among other social spaces. As illustrated in FIG. 2, the social spaces 202 can be positioned adjacent to one another and can include a dividing structure 204 (e.g., a wall). For example, the environment 200 can include an office complex, with social spaces 202 including two adjacent offices and the wall 204 being a shared wall between the two offices. The dividing structure 204 can define the social spaces 202 as separate social spaces 202A, 202B within a location (e.g., an office building).

In the depicted example, mobile devices 206A, 206B, 206C (collectively referred to as mobile devices 206) and audio sources 208A, 208B, 208C (collectively referred to as audio sources 208) are located in the social spaces 202A, 202B. The mobile devices 206 can correspond to the computing devices 102A-102D of FIG. 1, for example. As illustrated in FIG. 2, the mobile devices 206A and 206B are located within the social space 202A and the mobile device 206C is located within the social space 202B. However, any number of mobile devices 206 can be located within each of the social spaces 202A, 202B.

The audio sources 208A, 208B, 208C can include any source of audio that generates respective sound waves 210A, 210B, and 210C (collectively referred to as sound waves 210). For example, the sound waves 210 can include speech, music, ambient (background or environmental) noise, traffic noise, wind, alarms, bioacoustics noise from animals, and/or mechanical noise from devices such as refrigerators, air conditioners, power supplies, and/or motors. From the point of view of the mobile devices 206A-206C, the sound waves 210 include passively generated, ambient audio (i.e., the sound waves are not generated by one of the mobile devices 206). As provided in the example of FIG. 2, the audio source 208A generates the sounds waves 210A within the social space 202A, the audio source 208B generates the sound waves 210B within the social space 202B, and the audio source 208C generates the sound waves 210C within the social space 202B. The sound waves 210B and 210C can experience interference with respect to one another to provide sound wave 210D. As illustrated in FIG. 2, the audio sources 208 include a person generating the audio signal 210 by talking, such as a person giving a speech or a lecture. It is appreciated that the audio sources 208 can include any source of audio.

In some implementations, sound waves can be actively generated by one or more of the mobile devices 206. In some implementations, a mobile device 206 can generate sound waves that include reference audio in response to a lack of sufficient ambient audio detected within the social space 202. For example, in a quiet room, there can be a lack of environmental noise that is sufficient for the mobile devices 206 to detect, and/or for the mobile devices 206 to generate a useful audio fingerprint of. In some implementations, one of the mobile devices 206 can generate reference audio in response to a user input. In some implementations, when reference audio is actively generated, the reference audio can include encoded information. In some implementations, the encoded information can include an identifier that identifies the mobile device 206 that is the source of the reference audio. For example, when one of the mobile devices 206 generates the reference audio, the mobile device 206 can encode information into the reference audio identifying the mobile device 206, as discussed in further detail below.

In some implementations, the reference audio (e.g., a chirp or a buzz) can be audible or inaudible (e.g., sub-sonic) with respect to human hearing. For example, the reference audio can be at a frequency that is above a frequency that humans can audibly perceive (e.g., hear). In this manner, the reference audio does not contribute to environmental noises within a social space 202 that a user of the mobile device 206 may audibly perceive. As another example, the reference audio can be at a frequency that is within a frequency range that humans can audibly perceive.

The mobile devices 206 can be configured to experience (e.g., detect, hear, or otherwise perceive) the sound waves 210. To that end, each of the mobile devices 206 includes an audio sensor 212 (e.g., a microphone) to detect the sound waves 210. In the example of FIG. 2, the mobile device 206A includes an audio sensor 212A, the mobile device 206B includes an audio sensor 212B and the mobile device 206C includes an audio sensor 212C. Each of the audio sensors 212 can be responsive to the sound waves 210 and can generate an electronic audio signal based thereon.

As a result of the mobile devices 206A and 206B being located within the social space 202A and separated from the social space 202B by the dividing structure 204, the mobile devices 206A and 206B might not detect the sound waves 210B-210D. Additionally, as a result of the mobile device 206C being located within the social space 202B and separated from the social space 202A by the dividing structure 204, the mobile device 206C might not detect the sound waves 210A. In some implementations, the mobile devices 206 detect the sound waves 210 periodically (e.g., every 30 seconds, 2 minutes, or 10 minutes). In some implementations, the mobile devices 206 detect the sound waves 210 in response to a user input indicating a command to detect sound (such as by the users 108). In some implementations, the mobiles devices 206 detect the sound waves 210 in response to a control signal (such as a coarse proximity signal, described further below).

In accordance with implementations of the present disclosure, a determination and/or a confirmation of whether the mobile devices 206 are proximate to one another can be performed based on detection and processing of the sound waves 210. In some implementations, when two or more of the mobile devices 206 detect substantially the same audio, the two or more mobile devices 206 can be determined to be proximate to one another. To determine whether the two or more mobile devices 206 are considered proximate to one another, an analysis of what audio each mobile device 206 detects is analyzed and is compared.

Figure 3:
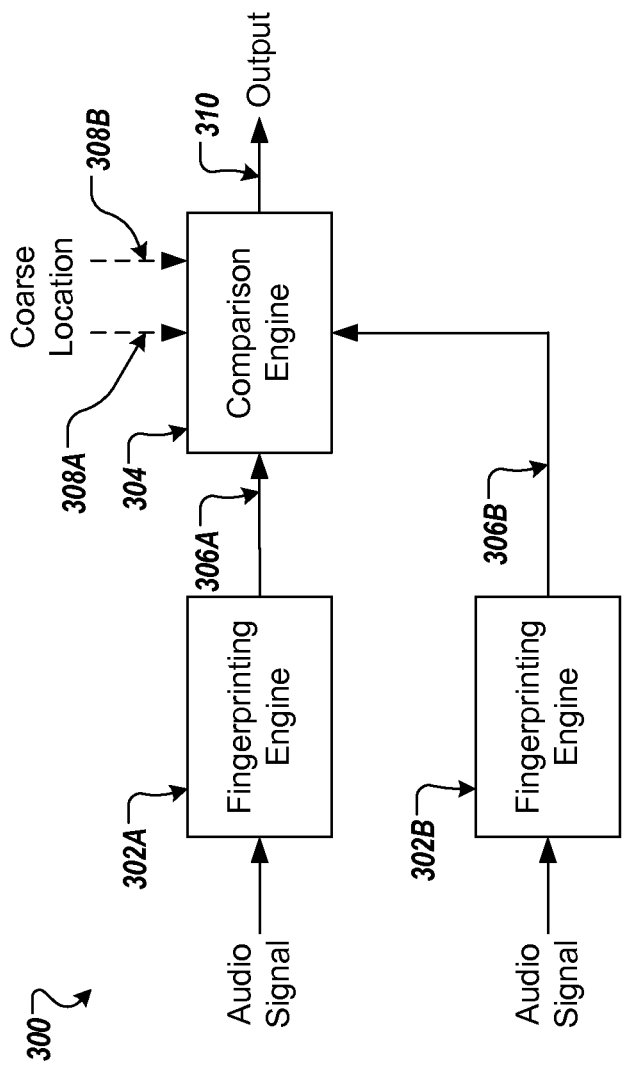
FIG. 3 depicts is a block diagram of an example system that includes components for determining whether two or more computing devices are proximate to one another.

FIG. 3 depicts a block diagram of an example system 300 that includes components for determining whether two or more computing devices (e.g., the computing devices 102) are proximate to one another. The example system 300 includes fingerprinting engines 302A and 302B (collectively referred to as fingerprinting engines 302) and a comparison engine 304. Each of the finger printing engines 302 and/or the comparison engine 304 can be provided as a computer program product that is executed using one or more computing devices. In some implementations, each computing device executes computer program code to provide a respective fingerprinting engine, and a server computing device executes computer program code to provide a comparison engine. In some implementations, each device can execute computer program code to provide a fingerprinting engine and a comparison engine.

In some implementations, each fingerprinting engine 302 receives a reference audio signal, generates a fingerprint of the reference audio signal, and outputs fingerprint data corresponding to the audio signal. The comparison engine 304 receives the fingerprint data from each of the fingerprinting engines 302, compares the fingerprint data, and outputs a result of the comparison. In some implementations, the output includes a determination of whether two computing devices are proximate to one another.

The example system 300 can include any number of fingerprinting engines 302. In some examples, the number of fingerprinting engines 302 can be based on the number of reference audio signals and/or based on the number of computing devices that perceive the reference audio signals. In particular, the fingerprinting engines 302 receive the sound waves 210 from a component (e.g., the audio sensor 212) of the mobile devices 206. Each of the fingerprinting engines 302 can be associated with one of the mobile devices 206. In some implementations, the mobile devices 206 (or similarly the computing devices 102) each include a respective fingerprinting engine 302. In some implementations, the server system 104 includes a fingerprinting engine 302. In some implementations, each of the mobile devices 206 includes a respective comparison engine 304. In some implementations, one of the mobile devices 206 can include the comparison engine 304. In some implementations, the comparison engine 304 can be split among the mobile devices 206 within the social space 202 in a peer-to-peer (P2P) network.

The fingerprinting engines 302A and 302B generate fingerprint signals 306A and 306B (collectively referred to as fingerprint signals 306), respectively, based on the respective audio signals that each fingerprinting engine 302 receives. The fingerprint of the audio signals can be provided as a condensed digital summary of the audio signals that can be used to identify the audio signals and/or compare the audio signals to other audio signals. Fingerprinting provides the ability to connect unlabeled snippets of audio content to respective data about that content. In some examples, the generation of the fingerprint of the audio signal by the fingerprint engines 302 includes processing the audio signals using one or more filters (e.g., a low-pass filter and/or a high-pass filter), converting the audio signal into a spectrogram and dividing the spectrogram into smaller spectral images. Wavelets can be computed based on the spectral images and the top-t spectral images can be extracted based on magnitude. A binary representation (i.e., a bit vector) is generated of the top-t spectral images. Each of the fingerprinting engines 302 outputs the fingerprint signal 306 of the received, respective audio signals. In some examples, the fingerprint signals 306 can include bit vectors as binary representations of the audio signals. It is appreciated, however, that other processes for generating a fingerprint based on an audio signal can be implemented.

The comparison engine 304 receives the fingerprint signals 306 from the fingerprinting engines 302. The comparison engine 304 compares the fingerprint signals 306 to one another to determine whether they are sufficiently similar to be identified as corresponding to the same audio. An audio spectrograph of the fingerprint signals 306 can be encoded and compared against each other for similarity. For example, and as noted above, the fingerprints can include respective bit vectors and the bit vectors can be compared to generate the similarity score. The similarity score can be compared to a threshold similarity score to determine whether the fingerprints are sufficiently similar to be identified as corresponding to the same audio.

In some examples, if the comparison engine 304 determines that the similarity score of any two of the fingerprint signals 306 is greater than the threshold similarity score, the comparison engine 304 determines that the fingerprint signals 306 are sufficiently similar and thus, the audio signals underlying the fingerprints represent the same reference audio. When two or more audio signals represent the same reference audio, the comparison engine 304 can determine that the two or more mobile devices 206 associated with the audio signals are proximate to one another. However, if the similarity score between two of the fingerprint signals 306 is not greater than the threshold similarity score, the comparison engine 304 determines that the fingerprint signals 306 are not sufficiently similar and thus, the audio signals underlying the fingerprints do not represent the same reference audio. The comparison engine 304 can output the proximity determination as a proximity indication signal 310. In some implementations, the comparison engine 304 can compare the fingerprint signals 306 from multiple fingerprint engines 302 concurrently. In some implementations, the comparison engine 304 determines the similarity score of any two of the fingerprint signals 306 to indicate a proximity level between the devices (i.e., how proximate the devices are). For example, the higher the similarity score between the devices, the more proximate, or closer, the two devices are. In some implementations, the similarity score can range between 0 and 1, wherein 1 indicates that the devices are proximate to one another and 0 indicates that the devices are not proximate. Values between 0 and 1 can indicate a level or proximity between the devices (i.e., how close the devices are), with values closer to 1 indicating a closer proximity between the devices.

Continuing with the examples of FIGS. 2 and 3, the mobile devices 206A and 206B are located within the social space 202A. The mobile devices 206A and 206B each acoustically detect (via the microphones 212A and 212B, respectively) the audio signal 210A. The fingerprinting engines 302A, 302B can be components provided by the mobile devices 206A, 206B, respectively. The fingerprinting engines 302A, 302B each generate the fingerprint signals 306A, 306B, respectively, based on the sound waves 210A. For example, each mobile device 206A, 206B converts the sound waves 210A to respective audio signals, which audio signals are processed to generate respective fingerprints. The comparison engine 304 receives the fingerprint signals 306A, 306B from the fingerprinting engines 302A, 302B, respectively. The comparison engine 304 compares the fingerprint signals 306A, 306B to each other and can determine that the fingerprint signals 306A, 306B correspond to the same reference audio (i.e., the sound waves 210A). As a result of the fingerprint signals 306A, 306B corresponding to the same reference audio, the comparison engine 304 can determine that the mobile devices 206A, 206B are proximate to each another. In other words, the mobile devices 206A, 206B are proximate to one another because both mobile devices 206A, 206B are determined to be located in the same social space (i.e., the social space 202A).

With continued reference to FIGS. 2 and 3, the mobile device 206B is located within the social space 202A and the mobile device 206C is located within the social space 202B. The mobile device 206B detects the sound waves 210A and the mobile device 206C detects the sound waves 210D. The fingerprinting engines 302A, 302B can be provided by the mobile devices 206B, 206C, respectively. The fingerprinting engine 302A generates the fingerprint signal 306A based on an audio signal that is generated in response to the sound waves 210A. The fingerprinting engine 302B generates the audio fingerprint signal 306B based on an audio signal that is generated in response to the sound waves 210D. The comparison engine 304 receives the fingerprint signals 306A, 306B from the fingerprinting engines 302A, 302B, respectively. The comparison engine 304 compares the fingerprint signals 306A, 306B to each other and can determine that the fingerprint signals 306A, 306B do not correspond to the same reference audio. Consequently, the comparison engine 304 can determine that the mobile devices 206B, 206C are in not proximate to one another. In some implementations, the mobile devices 206B, 206C can be determined to be located in differing social spaces. In the illustrated examples, the mobile device 206B is located in the social space 202A and the mobile device 206C is located in the social space 202B. Accordingly, even though the mobile devices 206B, 206C can be located geographically near to one another, the mobile devices 206B, 206C are not socially proximate. For example, the mobile devices 206B, 206C can be located in adjacent offices (i.e., adjacent social spaces) that share a common wall, however, the mobile devices 206B, 206C are not socially proximate to one another in the sense that the mobile devices 206B, 206C are not within the same social space.

In some implementations, the comparison engine 304 optionally receives coarse location signals 308A, 308B (collectively referred to as coarse location signals 308) corresponding to a coarse geographic location of the devices 206A, 206B, respectively. The coarse location signals 308 relate to a coarse geographic location between two or more mobile devices 206. The coarse geographic location between two or more mobile devices 206 can be determined based on a location signal. The location signal can be provided using a global positioning system (GPS), Wi-Fi network signals, and/or cell tower triangulation. In some examples, the coarse location between the two or more mobile devices 206 can be determined before, concurrently, or after the system 300 determines whether the two or more mobile devices 206 are proximate to one another.

When the coarse location signals 308 are provided to the comparison engine 304, the comparison engine 304 can determine the proximity of two or more mobile device 206 to confirm the geographic nearness between the two or more mobile devices 206. For example, as illustrated in FIG. 2, the mobile devices 206A, 206B are geographically near to one another (e.g., within a few feet of each other). Furthermore, as result of both being located with the social space 202A, both mobile devices 206A, 206B can detect the same sound waves (such as sound waves 210A). Therefore, both mobile devices 206A, 206B are proximate to one another as well, thus confirming the geographic location between the mobile devices 206A, 206B. In some implementations, by establishing the coarse proximity between two or more computing devices, situations can be prevented where the two or more computing devices detect substantially the same audio, but are not geographically near one another. For example, when two mobile devices detect a song on a car radio, but are located in differing cars that are not geographically near to one another.

In some implementations, the comparison engine 304 can determine the social proximity between two or more computing devices (such as the mobile devices 206) in response to the coarse location signals 308. Specifically, when the comparison engine 304 receives the coarse location signals 308 and determines that two or more computing devices are within a predetermined coarse geographic proximity (e.g., a few feet, a few yards, tens of yards), the comparison engine 304 can process audio detected by the computing devices to determine whether the computing devices are socially proximate to each other (i.e., within the same social space). In some implementations, the comparison engine 304 can determine the social proximity between two or more computing devices in response to a user input (e.g., a user command requesting a social proximity determination) via a graphical user interface (GUI) of one of the computing devices.

The coarse location signals 308 can each also be related to an output signal from a location-aware application installed and executed on a computing device (such as the mobile devices 206). In some implementations, a location-aware application can include any appropriate computer-executable application that a user of the computing devices executes to "check-in" to a location. For example, when the user is at a location, such as a restaurant or a shopping venue, the user executes the location-aware application. The location-aware application determines the location of the user (and the associated computing device) employing such means as GPS, Wi-Fi network signals, and/or cell tower triangulation. The location can be provided to a display of the computing device where the user confirms that they are indeed at the provided location. In some implementations, the location-aware application determines a plurality of locations that are near to the user (e.g., potential locations the user could be at), with a listing of the multiple locations provided to the user to select the specific location they are at. Once the location is determined by the location-aware application, the location-aware application can provide the location to the comparison engine 304 as a coarse location signal 308. The comparison engine 304 can determine the social proximity of two or more computing devices in response to a user "checking-in" to a location via a location-aware application.

As discussed above, when one of the mobile devices 206 actively generates the reference audio, the reference audio can include encoded information that identifies the mobile device 206 as the source of the reference audio. For example, the mobile device 206A can generate the reference audio. The reference audio can include encoded information identifying the mobile device 206A. For example, the encoded information identifying the mobile device 206A can include the caller identification number or the International Mobile Equipment Identity (IMEI) of the mobile device 206A. In some implementations, the information can be encoded in the reference audio by cryptographic signing that is checked by a server (e.g., the server system 104) or using certificates that are validated by the server (e.g., the server system 104). The mobile device 206B can detect the reference audio, process the reference audio and can determine that the reference audio includes the encoded information. The mobile device 206B can decode the encoded information to identify that the source of the reference audio is the mobile device 206A.

In response to identifying the source of the reference audio, the mobile device 206B can determine that the mobile device 206A is socially proximate to the mobile device 206B. In some implementations, the mobile device 206B can notify the mobile device 206A that it is in socially proximity to the mobile device 206B. In some implementations, the mobile device 206A can notify a central sever (e.g., the server system 104) in communication with the mobile device 206B that the mobile device 206A is socially proximity to the mobile device 206B, and the central server can communicate such information (the social proximity of the mobile devices 206A, 206B) to the mobile device 206A. In some implementations, the mobile device 206B can generate response audio to the encoded reference audio that can be detected by the mobile device 206A to inform the mobile device 206A that the mobile device 206B is socially proximate.

Figure 4:
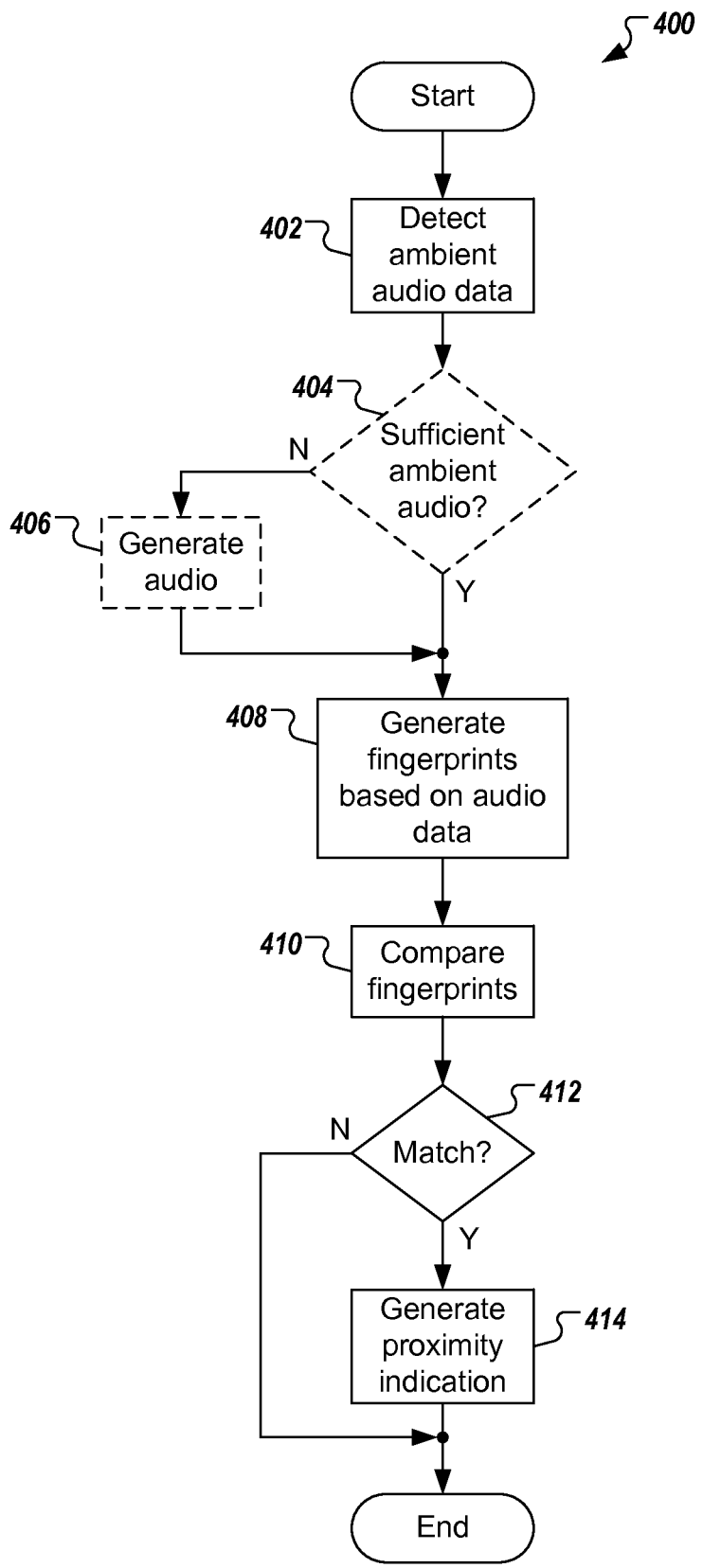
FIG. 4 is a flowchart of an example process for determining whether two or more computing devices are proximate to one another.

FIG. 4 is a flowchart of an example process 400 for determining whether computing devices are proximate to one another. The example process 400 can be executed using one or more computer program applications executed using one or more computing devices. For example, the mobile devices 206 and/or the server system 104 employing the system 300 of FIG. 3 can be used to execute the example process 400.

Ambient audio data is detected (402). For example, each of the mobile devices 206 samples ambient audio (such as environmental or background audio) from the social space 202. The mobile devices 206 collect the ambient audio via the acoustic sensors 212 (e.g., a microphone). Optionally, it can be determined whether the collected ambient audio is sufficient (404). The threshold for sufficiency of the ambient audio can be whether there is sufficient audio data collected that a fingerprint can be generated from the ambient audio. In some implementations, the mobile device 206 that collects the ambient audio can also determine whether the collected ambient audio is sufficient. In some implementations, the mobile devices 206 transmit the collected audio data to the server system 104, with the server system 104 determining whether the collected ambient audio is sufficient. Optionally, if it is determined that the collected ambient audio is not sufficient, audio can be generated (406). For example, one or more of the mobile devices 206 can generate the audio signal 210. The mobile device 206 can generate the audio signal 210 in response to the mobile device 206 or the server system 104 determining that the collected ambient audio is not sufficient. If it is determined that collected ambient audio is sufficient (at 404), or in response to generating the audio (at 406), or in response to collecting the ambient audio data (at 402), fingerprints are generated based on the audio (408). For example, the fingerprints can be generated based on each collected audio data from the mobile devices 206. The fingerprints can be generated by the fingerprinting engine 302. Further, the fingerprints can be generated based on the collected ambient audio data or optionally the generated audio.

The fingerprints are compared (410). Specifically, the fingerprints of the audio data can be analyzed and compared to determine if the fingerprints match, that is, if the comparison determination is above a threshold. The fingerprints can be compared by the comparison engine 304. In some implementations, the fingerprints include bit vectors as binary representations of the audio data. Thus, the comparison engine 302 compares the bit vectors to determine if the similarity between the two bit vectors is above a threshold. If the similarity (412) between the fingerprints is above a threshold (i.e., "match"), a proximity indication is generated (414). Specifically, a proximity (e.g., a social proximity) between at least two computing devices, such as mobile devices 206, is established. However, if the similarity between the fingerprints is not above the threshold (i.e., not "matched"), the process ends.

Figure 5:
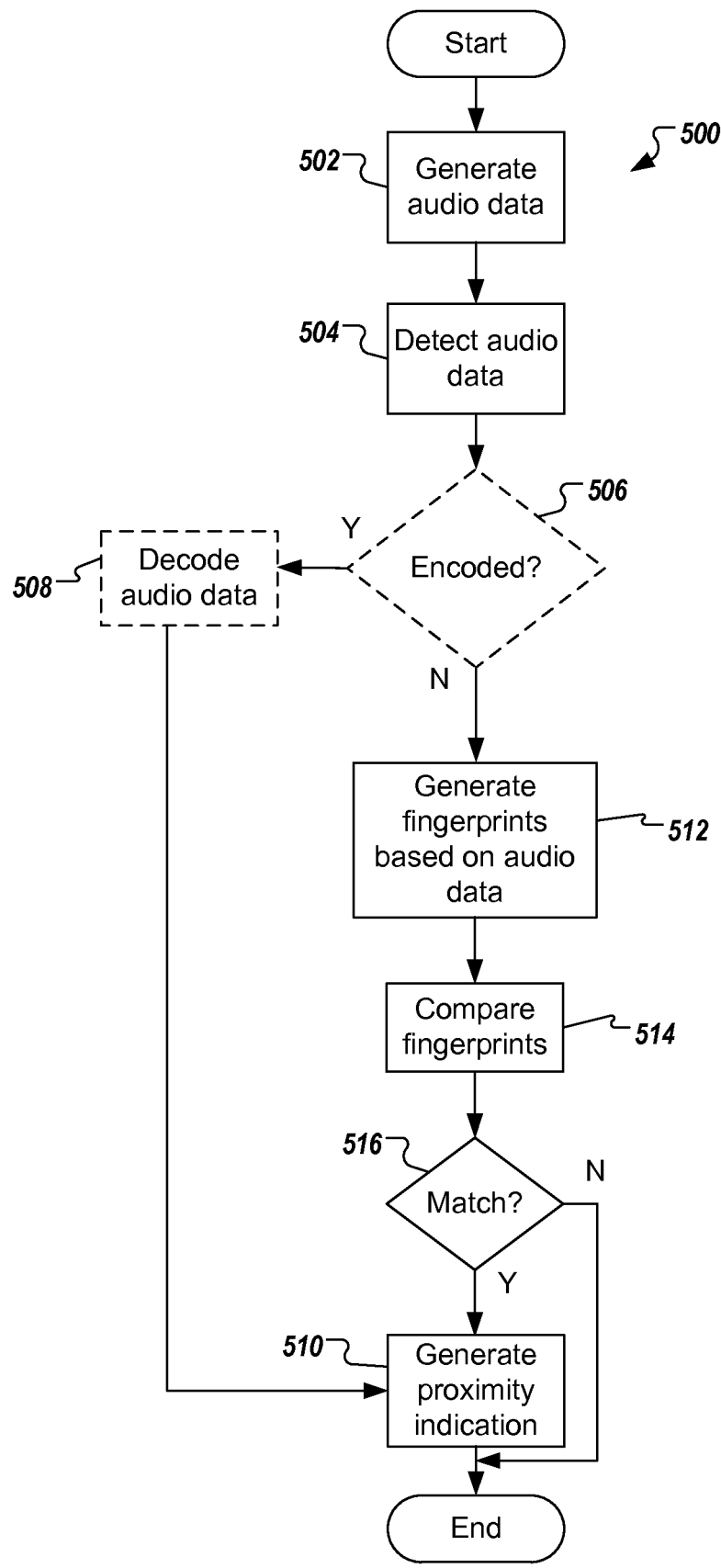
FIG. 5 is a flowchart of an example process for determining whether two or more computing devices are proximate to one another using actively generated audio.

FIG. 5 is a flowchart of an example process 500 for determining whether two or more computing devices are proximate to one another using an actively generated audio reference signal. The example process 500 can be executed using one or more computer program applications executed using one or more computing devices. For example, the mobile devices 206 and/or the server system 104 employing the system 300 of FIG. 3 can be used to execute the example process 500.

Audio data can be generated (502). For example, the mobile device 206A can generate the audio signal 210A. In some implementations, the mobile device 206A can generate the audio signal 210A to include encoded information to identify that the source of the audio signal 210A is the mobile device 206A. The audio data is detected (504). For example, the mobile device 206B collects the generated audio data via the acoustic sensor 212B. Optionally, it is determined whether the audio data contains encoded information (506). In some implementations, the mobile device 206B determines whether the collected audio data contains encoded information. In some implementations, the mobile device 206B transmits the collected audio data to the server system 104, with the server system 104 determining whether the collected audio data includes encoded information.

If the collected audio data includes encoded information, optionally the audio data is decoded (508). For example, the mobile device 206A can decode the audio signal 210A to identify that the source of the audio signal 210A is the mobile device 206B. In some implementations, the server system 104 decodes the audio signal 210A. A proximity indication is generated (510). Specifically, a social proximity between the mobile devices 206A and 206B is established. In some implementations, the mobile device 206A can notify the mobile device 206B that it is in proximity to the mobile device 206A and/or notify the server system 104.

If the collected audio data does not include encoded information, fingerprints are generated based on the audio (512) and compared (514), similar to that mentioned above with respect to steps 410 and 412, respectively, of FIG. 4. If the similarity (516) between the fingerprints is above a threshold (i.e., "match"), the proximity indication is generated (510). Specifically, a social proximity between at least two computing devices, such as mobile devices 206A and 206B is established. However, if the similarity between the fingerprints is not above the threshold (i.e., not "matched"), the process ends.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this present disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method, comprising:
   generating a first coarse location signal based on a first coarse location of a first computing device;
   comparing the first coarse location and a second coarse location of a second computing device to determine that the first and the second coarse locations are within a predetermined coarse geographic proximity; and
   in response to determining that the first and the second coarse locations are within the predetermined coarse geographic proximity, performing a proximity detection, including:
      generating an audio signal by the first computing device,
      generating a first audio fingerprint based on the audio signal,
      comparing the first audio fingerprint and a second audio fingerprint associated with the second computing device, and
      generating a proximity signal based on the comparison of the first audio fingerprint and the second audio fingerprint.

2. The computer-implemented method of claim 1, wherein generating the audio signal includes generating an audible signal.

3. The computer-implemented method of claim 1, wherein generating the audio signal includes generating an inaudible signal.

4. The computer-implemented method of claim 1, further comprising receiving the second audio fingerprint from the second computing device.

5. The computer-implemented method of claim 1, wherein performing the proximity detection is performed by the first computing device.

6. The computer-implemented method of claim 1, wherein the proximity signal indicates that the second computing device is proximate to the first computing device.

7. The computer-implemented method of claim 1, wherein comparing the first audio fingerprint and the second audio fingerprint associated with the second computing device comprises:
   determining a similarity score based on the first audio fingerprint and the second audio fingerprint;
   comparing the similarity score to a threshold similarity score; and
   generating the proximity signal based on comparing the similarity score to a threshold similarity score.

8. The computer-implemented method of claim 7, wherein the proximity signal indicates that the first computing device is located proximate to the second computing device when the similarity score is greater than the threshold similarity score.

9. The computer-implemented method of claim 1, wherein generating the audio signal by the first computing device is in response to determining that a magnitude of ambient audio is below a threshold.

10. A computing device, comprising:
    a non-transitory computer-readable medium coupled to the computing device having instructions stored thereon which, when executed by the computing device, cause the computing device to perform operations comprising:
       generating a first coarse location signal based on a first coarse location of a first computing device;
       comparing the first coarse location and a second coarse location of a second computing device to determine that the first and the second coarse locations are within a predetermined coarse geographic proximity; and
       in response to determining that the first and the second coarse locations are within the predetermined coarse geographic proximity, performing a proximity detection, including:
          generating an audio signal by the first computing device,
          generating a first audio fingerprint based on the audio signal,
          comparing the first audio fingerprint and a second audio fingerprint associated with the second computing device, and
          generating a proximity signal based on the comparison of the first audio fingerprint and the second audio fingerprint.

11. The computing device of claim 10, wherein generating the audio signal includes generating an inaudible signal.

12. The computing device of claim 10, the operations further comprising receiving the second audio fingerprint from the second computing device.

13. The computing device of claim 10, wherein performing the proximity detection is performed by the first computing device.

14. The computing device of claim 10, wherein the proximity signal indicates that the second computing device is proximate to the first computing device.

15. The computing device of claim 10, wherein comparing the first audio fingerprint and the second audio fingerprint associated with the second computing device comprises:
    determining a similarity score based on the first audio fingerprint and the second audio fingerprint;
    comparing the similarity score to a threshold similarity score; and
    generating the proximity signal based on comparing the similarity score to a threshold similarity score.

16. The computing device of claim 15, wherein the proximity signal indicates that the first computing device is located proximate to the second computing device when the similarity score is greater than the threshold similarity score.

17. A computer storage medium encoded with a computer program, the program comprising instructions that when executed by one or more computers cause the one or more computers to perform operations comprising:
    generating a first coarse location signal based on a first coarse location of a first computing device;
    comparing the first coarse location and a second coarse location of a second computing device to determine that the first and the second coarse locations are within a predetermined coarse geographic proximity; and
    in response to determining that the first and the second coarse locations are within the predetermined coarse geographic proximity, performing a proximity detection, including:
       generating an audio signal by the first computing device,
       generating a first audio fingerprint based on the audio signal,
       comparing the first audio fingerprint and a second audio fingerprint associated with the second computing device, and
       generating a proximity signal based on the comparison of the first audio fingerprint and the second audio fingerprint.

18. The computer storage medium of claim 17, wherein performing the proximity detection is performed by the first computing device.

19. The computer storage medium of claim 17, wherein the proximity signal indicates that the second computing device is proximate to the first computing device.

20. The computer storage medium of claim 17, wherein comparing the first audio fingerprint and the second audio fingerprint associated with the second computing device comprises:
- determining a similarity score based on the first audio fingerprint and the second audio fingerprint;
- comparing the similarity score to a threshold similarity score; and
- generating the proximity signal based on comparing the similarity score to a threshold similarity score.

* * * * *